US012692330B2

(12) United States Patent
Higuma et al.

(10) Patent No.: US 12,692,330 B2
(45) Date of Patent: Jul. 28, 2026

(54) FLUORORUBBER COMPOSITION

(71) Applicant: NOK CORPORATION, Tokyo (JP)

(72) Inventors: Takahiro Higuma, Kanagawa (JP);
Hirokazu Maekawa, Kumamoto (JP)

(73) Assignee: NOK CORPORATION, Tokyo (JP)

( * ) Notice: Subject to any disclaimer, the term of this
patent is extended or adjusted under 35
U.S.C. 154(b) by 649 days.

(21) Appl. No.: 17/791,019

(22) PCT Filed: Dec. 14, 2020

(86) PCT No.: PCT/JP2020/046551
§ 371 (c)(1),
(2) Date: Jul. 6, 2022

(87) PCT Pub. No.: WO2021/140837
PCT Pub. Date: Jul. 15, 2021

(65) Prior Publication Data

US 2023/0022910 A1 Jan. 26, 2023

(30) Foreign Application Priority Data

Jan. 7, 2020 (JP) ................................. 2020-000967

(51) Int. Cl.
C08F 114/26 (2006.01)
C08F 214/22 (2006.01)
C08F 214/26 (2006.01)
C08K 3/04 (2006.01)
C08K 7/06 (2006.01)

(52) U.S. Cl.
CPC .......... *C08F 114/26* (2013.01); *C08F 214/22*
(2013.01); *C08F 214/26* (2013.01); *C08K
3/041* (2017.05); *C08K 7/06* (2013.01); *C08K
2201/003* (2013.01); *C08K 2201/004*
(2013.01); *C08K 2201/011* (2013.01)

(58) Field of Classification Search
CPC .... C08F 114/26; C08F 214/22; C08F 214/26;
C08K 3/041; C08K 7/06; C08K
2201/003; C08K 2201/004; C08K
2201/011; F16J 15/3284; F16J 15/102;
C08L 27/16; C08L 27/18; C09K 3/1009
See application file for complete search history.

(56) References Cited

U.S. PATENT DOCUMENTS

| | | | |
|---|---|---|---|
| 9,920,187 B2 | 3/2018 | Aiba et al. | |
| 2011/0274861 A1* | 11/2011 | Stevens ................ | C09K 3/1009 |
| | | | 525/200 |
| 2014/0221533 A1* | 8/2014 | Hata ........................ | C09K 5/14 |
| | | | 524/588 |
| 2016/0347895 A1* | 12/2016 | Morikawa ................. | C08F 2/24 |
| 2017/0107416 A1 | 4/2017 | Hata et al. | |
| 2017/0130032 A1 | 5/2017 | Aiba et al. | |
| 2017/0152924 A1* | 6/2017 | Tsuji ......................... | F16H 9/18 |
| 2020/0115512 A1* | 4/2020 | Komatsu ................... | B29B 7/72 |
| 2021/0147639 A1 | 5/2021 | Murakami et al. | |

FOREIGN PATENT DOCUMENTS

| | | | | | |
|---|---|---|---|---|---|
| JP | 2000103918 A | * | 4/2000 | | |
| WO | 2013/051707 A1 | | 4/2013 | | |
| WO | 2015/146862 A1 | | 10/2015 | | |
| WO | WO-2018225789 A1 | * | 12/2018 | ............... | B29B 7/72 |
| WO | 2019/009188 A1 | | 1/2019 | | |
| WO | 2019/155975 A1 | | 8/2019 | | |

OTHER PUBLICATIONS

Machine translation of JP 2000 103918 (Year: 2000).*
International Search Report issued in International Patent Application No. PCT/JP2020/046551, dated Feb. 16, 2021, along with an English translation thereof.
Written Opinion of the International Searching Authority issued in International Application No. PCT/JP2020/046551, dated Feb. 16, 2021, along with an English translation thereof.
International Preliminary Report on Patentability in International Application No. PCT/JP2020/046551, dated Feb. 16, 2021, along with an English translation thereof.
Seisuke Ata et al., "Highly Thermally Conductive Yet Flexible Composite of Carbon Fiber, Carbon Nanotube, and Rubber Obtained by Decreasing the Thermal Resistivity at the Interface between Carbon Fiber and Carbon Nanotube" Advanced Engineering Materials, vol. 19 No. 2, Nov. 2, 2016, 7 pages, XP 072137456.

* cited by examiner

*Primary Examiner* — Doris L Lee
(74) *Attorney, Agent, or Firm* — GREENBLUM &
BERNSTEIN, P.L.C.

(57) ABSTRACT

A fluororubber composition comprising 3 to 20 parts by weight of carbon fibers and 1 to 8 parts by weight of carbon nanotubes based on 100 parts by weight of fluororubber. The crosslinked molded article obtained from the fluororubber composition has excellent effects of not only imparting oil film retention, but also improving the material strength of fluororubber due to the combined use of carbon nanotubes, which have high reinforcing properties. Further, the fluororubber composition can give a fluororubber crosslinked product excellent in abrasion resistance and pressure resistance.

7 Claims, No Drawings

FLUORORUBBER COMPOSITION

TECHNICAL FIELD

The present invention relates to a fluororubber composition. More particularly, the present invention relates to a fluororubber composition that is used as a molding material, such as a seal member for transmission.

BACKGROUND ART

In recent years, there has been a strong demand for reducing the fuel consumption of vehicles against the background of the low-carbon society. Accordingly, the demand on vehicle transmission for CVT (continuously variable transmission) vehicle tends to increase.

CVT is a type of continuously variable transmission comprising two pulleys and one belt. The pulley part is composed of a combination of a primary part (input side) and a secondary part (output side), which are connected to each other by a belt. By changing the width of the pulley, the contact radius between the pulley and the belt changes, and the turning radius of the belt changes, resulting in an infinitely variable speed change mechanism.

The pulley part rotates and reciprocates at a high speed when the speed changes due to the change in the width of the pulley part, and the seal used in the pulley part also rotates and reciprocates together. Therefore, the improvement of the seal performance can contribute to the improvement of fuel efficiency. For example, effects such as elimination of electric oil pump (reduction in unit weight), application of an idling stop mechanism and support of towing can be expected.

Conventionally, seal rings have been the mainstream of seals for such CVT pulley parts, and actuate the pulley and maintain hydraulic pressure. However, seal rings are not intended to prevent external leakage of fluid, but to maintain the pressure of fluid in the hydraulic circuit. Thus, their sealing properties were not sufficient, and an idling stop system could not be established by eliminating electric oil pumps in some cases.

On the other hand, squeeze packings, such as O rings and D rings, have been recently used to seal CVT pulley parts because they can ensure better sealing performance than seal rings. Compared with seal rings, squeeze packings have superior sealing properties and are single molded bodies, making them preferable seal members in terms of workability during assembly and product cost.

Thus, the improvement in sealing performance can be achieved easily and at low cost by using rubber squeeze packings. However, the seal vibrates slightly with the belt rotation in CVT pulley parts; thus, the rubber squeeze packings are easily worn. Rubber members used as squeeze packings are required to be excellent in abrasion resistance as well as sealing performance.

That is, seal parts of CVT pulleys have two seal parts, a primary part on the input side and a secondary part on the output side, and both the primary and secondary parts slightly vibrate with the belt rotation. Therefore, a high abrasion force is generated in the area where the seal member and the housing contact closely, so that the seal member is required to have abrasion resistance.

Moreover, the seal pressure is different between the primary and secondary parts, and the secondary part is in a higher pressure environment. Accordingly, excessive abrasion caused by a protrusion portion occurs in the secondary part, and the protrusion portion is damaged. As a result, there is a risk that the form of the seal member may no longer be constituted. Therefore, pressure resistance is also required for seal materials of CVT pulley parts.

Thus, under conditions with reciprocating movement, such as transmission seal members, particularly CVT pulley seal members, sliding occurs between the seal member and the rotating shaft. Accordingly, the abrasion resistance of the seal member is particularly important, and pressure resistance is also required.

In Patent Document 1, the present applicant has previously proposed a hydrogenated nitrile rubber composition excellent in abrasion resistance and pressure resistance, comprising 3 to 20 parts by weight of carbon fibers or wollastonite as a hard filler, and 72 to 87 parts by weight of carbon black having an average particle diameter of 40 to 50 nm, an iodine adsorption of 35 to 49 g/kg, and a DBP oil absorption of 100 to 160 ml/100 g, based on 100 parts by weight of hydrogenated nitrile rubber.

On the other hand, in specifications for which heat resistance and chemical resistance are required, seal members made of fluororubber are generally applied. However, when fluororubber was compounded with carbon fibers, fluororubber was inferior in substrate strength to hydrogenated nitrile rubber; thus, there was a difficulty that sufficient strength could not be ensured in a harsher environment.

Moreover, while squeeze packings have better sealing properties than seal rings, there are still problems with pressure resistance (protrusion resistance under high hydraulic pressure). In CVT pulley applications, particularly when used under the conditions of high hydraulic pressure and micro amplitude reciprocating movement, the seal member may protrude into the minute gap between the rotating shaft and the housing due to hydraulic pressure, and the protruding part may be damaged by repeatedly receiving the micro amplitude reciprocating movement.

PRIOR ART DOCUMENT

Patent Document

Patent Document 1: WO 2015/146862 A1

OUTLINE OF THE INVENTION

Problem to be Solved by the Invention

An object of the present invention is to provide a fluororubber composition that can give a fluororubber cross-linked product excellent in abrasion resistance and pressure resistance.

Means for Solving the Problem

The above object of the present invention can be achieved by a fluororubber composition comprising 3 to 20 parts by weight of carbon fibers and 1 to 8 parts by weight of carbon nanotubes based on 100 parts by weight of fluororubber.

Effect of the Invention

A crosslinked molded article obtained from the fluororubber composition according to the present invention has excellent effects of not only imparting oil film retention, but also improving the material strength of fluororubber due to the combined use of carbon nanotubes, which have high reinforcing properties.

Moreover, due to the use of carbon nanotubes of a specific shape, a specific reinforcing effect can be obtained, which leads to the improvement of pressure resistance. That is, since it is possible to suppress protrusion due to hydraulic pressure, fatal damage can be suppressed.

Furthermore, by incorporating carbon fibers into the entangled fibers of carbon nanotubes, it is expected to be able to prevent a phenomenon that the carbon fibers fall off during sliding.

EMBODIMENTS FOR CARRYING OUT THE INVENTION

The fluororubber composition of the present invention comprises, based on 100 parts by weight of fluororubber, 3 to 20 parts by weight of carbon fibers and 1 to 8 parts by weight of carbon nanotubes, and preferably further 3 to 20 parts by weight of polytetrafluoroethylene.

As the fluororubber, polyol-crosslinkable fluororubber or peroxide-crosslinkable fluororubber is preferably used. Further, polyol-crosslinkable fluororubber and peroxide-cross-linkable fluororubber can be used in combination.

As the fluororubber, a homopolymer or copolymer of one or two or more fluorine-containing olefins can be used.

Examples of the fluorine-containing olefins include vinylidene fluoride, hexafluoropropylene, pentafluoropropylene, trifluoroethylene, trifluorochloroethylene, tetrafluoroethylene, vinyl fluoride, perfluoroacrylic acid ester, perfluoroalkyl acrylate, perfluoro methyl vinyl ether, perfluoro ethyl vinyl ether, perfluoro propyl vinyl ether, and the like. These fluorine-containing olefins can be used singly or in combination of two or more.

Preferable examples of the fluororubber used in the present invention include vinylidene fluoride-hexafluoropropylene copolymer, vinylidene fluoride-tetrafluoroethylene-hexafluoropropylene terpolymer, vinylidene fluoride-hexafluoropropylene-perfluoroalkyl vinyl ether terpolymer, and the like. The copolymer can be obtained by solution polymerization, suspension polymerization, or emulsion polymerization, and are also commercially available (e.g., "Viton A-500" and "Viton B-600" produced by DuPont, and "G7401" by produced by Daikin Industries, Ltd.).

The introduction of an iodine and/or bromine group enabling peroxide crosslinking of the fluororubber can be carried out by a copolymerization reaction in the presence of an iodine and/or bromine group-containing saturated or unsaturated compound.

When a bromine and/or iodine group is contained as a side chain of a fluorine-containing copolymer, examples of such copolymer include copolymer of a crosslinking site-forming monomer such as perfluoro(2-bromoethyl vinyl ether), 3,3,4,4-tetrafluoro-4-bromo-1-butene, 2-bromo-1,1-difluoroethylene, bromotrifluoroethylene, perfluoro(2-iodoethyl vinyl ether) and iodotrifluoroethylene.

When an iodine and/or bromine group is contained as a terminal group of a fluorine-containing copolymer, a fluoroalkylene compound halogenated at both ends represented by the general formula: $X_1 C_n F_{2n} X_2$ ($X_1$: F, Br, or I; $X_2$: Br or I; and n: 1 to 12) is used. In terms of the balance of reactivity and handling, copolymer containing an iodine and/or bromine group, derived from 1-bromoperfluoroethane, 1-bromoperfluoropropane, 1-bromoperfluorobutane, 1-bromoperfluoropentane, 1-bromoperfluorohexane, 1-iodoperfluoroethane, 1-iodoperfluoropropane, 1-iodoperfluorobutane, 1-iodoperfluoropentane, and 1-iodoperfluorohexane, in which n is 1 to 6, are preferably used.

Moreover, when $X_1$ and $X_2$ are made I and/or Br, a crosslinking site can be introduced into the terminal position of a fluorine-containing copolymer. Examples of such a compound include 1-bromo-2-iodotetrafluoroethane, 1-bromo-3-iodoperfluoropropane, 1-bromo-4-iodoperfluorobutane, 2-bromo-3-iodoperfluorobutane, monobromomonoiodoperfluoropentane, monobromomonoiodoperfluoro-n-hexane, 1,2-dibromoperfluoroethane, 1,3-dibromoperfluoropropane, 1,4-dibromoperfluorobutane, 1,5-dibromoperfluoropentane, 1,6-dibromoperfluorohexane, 1,2-diiodoperfluoroethane, 1,3-diiodoperfluoropropane, 1,4-diiodoperfluorobutane, 1,5-diiodoperfluoropentane, 1,6-diiodoperfluorohexane, and the like. These compounds can also be used as a chain transfer agent.

The copolymer can be obtained by solution polymerization, suspension polymerization, or emulsion polymerization, and are also commercially available (e.g., "GBL-600S" and "GLT-600S" produced by DuPont, and "DAIEL-G801" produced by Daikin Industries, Ltd.).

As the carbon fibers, general carbon fibers such as pitch-based carbon fibers and PAN-based carbon fibers, which have a fiber diameter of about 5 to 20 μm, preferably about 5 to 15 μm, a fiber length of about 10 to 200 μm, preferably about 20 to 100 μm, and a Mohs hardness of 3 to 6, preferably 4 to 6, are used. The carbon fibers are used at a ratio of 3 to 20 parts by weight, preferably 5 to 15 parts by weight, based on 100 parts by weight of the fluororubber. If the carbon fibers are used at a ratio less than this range, the desired abrasion resistance of the crosslinked product cannot be ensured. In contrast, if the carbon fibers are used at a ratio larger than this range, material strength and abrasion resistance are improved; however, lubricity is lost.

As the carbon nanotubes, single layer carbon nanotubes or multilayer carbon nanotubes having an average diameter of about 1 to 20 nm, preferably about 5 to 15 nm, an average fiber length of about 1 to 1000 μm, preferably about 1 to 100 μm, more preferably 1 to 80 μm, and a BET specific surface area of about 100 to 1000 m²/g, preferably about 100 to 500 m²/g, are used at a ratio of about 1 to 8 parts by weight, preferably about 2 to 6 parts by weight, based on 100 parts by weight of the fluororubber. If the carbon nanotubes are used at a ratio less than this range, material strength and pressure resistance are deteriorated. In contrast, if the carbon nanotubes are used at a ratio larger than this range, elongation is insufficient.

In the fluororubber composition comprising the above essential components, polytetrafluoroethylene (PTFE), preferably PTFE having an average particle diameter of about 1 to 20 μm, preferably about 1 to 15 μm, can be used at a ratio of about 20 parts by weight or less, generally about 3 to 20 parts by weight, preferably about 5 to 15 parts by weight. The use of PTFE can further improve the abrasion resistance of seal members accompanying sliding. However, if PTFE is used at a ratio larger than this range, material strength is deteriorated, which is not preferable.

Further, in addition to the above components, it is possible to add compounding agents, including fillers or reinforcing agents, such as carbon black and silica; processing aids, such as wax, metal soap and carnauba wax; acid acceptors, such as calcium hydroxide, magnesium oxide, zinc oxide and hydrotalcite; anti-aging agents; and thermoplastic resin.

For the step of dispersing each compounding component in fluororubber, an open roll method, a closed kneading method, or a multi-screw extrusion kneading method can be used. Further, a kneader can also be used. In this case, kneading is carried out at about 100 to 200° C., preferably about 140 to 180° C.

The mixed materials can be mixed with a crosslinking agent, followed by crosslinked molding, thereby producing a fluororubber crosslinked molded article. As the crosslinking agent, a polyol-based crosslinking agent or an organic peroxide crosslinking agent is used.

Bisphenols are preferable as the polyol-based crosslinking agent. Specific examples of bisphenol include polyhydroxy aromatic compound such as 2,2-bis(4-hydroxyphenyl)propane [bisphenol A], 2,2-bis(4-hydroxyphenyl) perfluoropropane [bisphenol AF], bis(4-hydroxyphenyl) sulfone [bisphenol S], bisphenol A-bis(diphenyl phosphate), 4,4'-dihydroxydiphenyl, 4,4'-dihydroxydiphenylmethane, 2,2-bis(4-hydroxyphenyl)butane, and the like. Bisphenol A, bisphenol AF, and the like are preferably used. These may be in the form of alkali metal salts or alkaline earth metal salts. The polyol-based crosslinking agent is used at a ratio of about 1 to 10 parts by weight based on 100 parts by weight of fluororubber.

Further, a commercially available masterbatch containing a raw material rubber and a crosslinking agent may be used as the polyol-based crosslinking agent. These crosslinking agents may be used singly or in combination of two or more.

A crosslinking accelerator can be used in the production of a crosslinked fluororubber. As the crosslinking accelerator, for example, a quaternary phosphonium salt can be used.

Specific examples of the quaternary phosphonium salt include tetraphenylphosphonium chloride, triphenylbenzylphosphonium chloride, triphenylbenzylphosphonium bromide, triphenylmethoxymethylphosphonium chloride, (methylcarbonylmethyl)triphenylphosphonium chloride, triphenylethoxycarbonylmethylphosphonium chloride, trioctylbenzylphosphonium chloride, trioctylmethylphosphonium bromide, trioctylethylphosphonium acetate, tetraoctylphosphonium chloride, cetyldimethylbenzylphosphonium chloride, etc. The polyol-based crosslinking agent is used at a ratio of about 0.1 to 5 parts by weight based on 100 parts by weight of the fluororubber.

As the crosslinking accelerator, a commercially available masterbatch containing a raw material rubber and a crosslinking accelerator may be used. Further, these crosslinking agents may be used singly or in combination of two or more.

As the crosslinking accelerator, a quaternary ammonium salt can be used singly or in combination with the quaternary phosphonium salt mentioned above. Examples of the quaternary ammonium salt include 5-benzyl-1,5-diazabicyclo[4.3.0]-5-nonenium tetrafluoroborate or 5-benzyl-1,5-diazabicyclo[4.3.0]-5-nonenium hexafluorophosphate, etc.

Tetrafluoroborate or hexafluorophosphate has a melting point of about 80° C. or 100° C., respectively, and is easily melted during heat kneading (about 100° C.) using a roll, a kneader, a Banbury mixer, or the like. Thus, they are excellent in dispersibility.

A commercially available masterbatch containing a raw material fluororubber and quaternary ammonium salt may be used as the quaternary ammonium salt. Further, these crosslinking accelerators may be used singly or in combination of two or more.

Examples of the organic peroxide-based crosslinking agent include 2,5-dimethylhexane-2,5-dihydro peroxide, 2,5-dimethyl-2,5-di(benzoylperoxy)hexane, tert-butyl peroxide, dicumyl peroxide, tert-butyl cumyl peroxide, 1,1-di(tert-butylperoxy)-3,3,5-trimethylcyclohexane, 2,5-dimethyl-2,5-di(tert-butylperoxy)hexane, 2,5-dimethyl-2,5-di(tert-butylperoxy)hexyne-3, 1,3-di(tert-butylperoxyisopropyl)benzene, tert-butyl peroxybenzoate, tert-butylperoxy isopropylcarbonate, n-butyl-4,4-di(tert-butylperoxy)valerate, and the like. For them, commercially available products (such as Perhexa 25B-40 produced by NOF Corporation) can be used as they are. The organic peroxide-based crosslinking agent is used at a ratio of about 1 to 10 parts by weight based on 100 parts by weight of the fluororubber.

Further, as the peroxide cross-linking agent, a commercially available masterbatch containing a raw material rubber and a crosslinking agent may be used. These crosslinking agents may be used singly or in combination of two or more.

As the crosslinking accelerator (aid) that can be used in the peroxide-based crosslinking system, triallyl isocyanurate, triallyl cyanurate, trimethylolpropane trimethacrylate or the like is used.

The fluororubber composition, which is a kneaded product of these components, is, for example, vulcanized under pressure and heating to form a crosslinked molded article. Specifically, the obtained fluororubber composition is heated generally at a temperature of about 140 to 230° C. for about 1 to 120 minutes (primary vulcanization) using an injection molding machine, a compression molding machine, a vulcanizing press machine, an oven, or the like, thereby obtaining a fluororubber crosslinked molded article. Further, if necessary, secondary vulcanization is carried out, for example, by performing heat treatment in an oven in a temperature range of about 200 to 300° C. for about 1 to 20 hours.

The obtained crosslinked molded article is effectively used, for example, as a seal member for vehicle transmission, particularly for CVT pulley.

EXAMPLES

The following describes the present invention with reference to Examples.

Example 1

| | |
|---|---|
| Fluororubber (G7401 produced by Daikin Industries, Ltd.; polyol crosslinking agent-containing product) | 100 parts by weight |
| Carbon black (Seast 3 produced by Tokai Carbon Co., Ltd.; iodine adsorption: 80 g/kg; DBP oil absorption: 101 ml/100 g) | 15 parts by weight |
| Carbon fiber [CF] (produced by Osaka Gas Chemicals Co., Ltd. Donacarbo Milled S-2404N; average fiber diameter: 13 μm, average fiber length: 25 to 50 μm, Mohs hardness: 4.5 to 5) | 10 parts by weight |
| Carbon nanotube [CNT] (NC7000 produced by Nanocyl SA. average diameter: 9.5 nm, average fiber length: 1.5 μm, BET specific surface area: 250 to 300 m²/g) | 3 parts by weight |
| PTFE (RubronL-5 produced by Daikin Industries, Ltd.; average particle diameter: 5 μm) | 10 parts by weight |
| Calcium hydroxide (Caldic#1000 produced by Ohmi Chemical Industry Co., Ltd.) | 6 parts by weight |
| Magnesium oxide (Kyowamag 150 produced by Kyowa Chemical Industry Co., Ltd.) | 3 parts by weight |

Each of the above components was kneaded with a kneader and an open roll, and the kneaded product was vulcanized with a vulcanizing press at 170° C. for 15 minutes, thereby obtaining a test piece with a length of 150 mm, a width of 100 mm, and a thickness of 2 mm.

7

Example 2

In Example 1, the amount of carbon fiber was changed to 20 parts by weight.

Example 3

In Example 1, the amount of carbon nanotube was changed to 5 parts by weight.

Example 4

In Example 1, the PTFE was not used.

Comparative Example 1

In Example 1, the carbon fiber was not used.

Comparative Example 2

In Example 1, the amount of carbon fiber was changed to 25 parts by weight.

Comparative Example 3

In Example 1, the carbon nanotube was not used.

Comparative Example 4

In Example 1, the amount of carbon nanotube was changed to 10 parts by weight.

The fluororubber crosslinked molded articles obtained in each of the above Examples and Comparative Examples were measured for normal state physical properties, and evaluated for abrasion resistance and pressure resistance.

8

Abrasion resistance: A micro sliding durability test was carried out under the following conditions on a D ring DRO (inner diameter: 121×outer diameter: 129.2×thickness: 2.3 (mm) product shape), and the appearance of the sliding surface was visually determined.

temperature: 120° C.
pressure: 2.8 MPa
sliding distance: 0.3 mm
frequency: 30 Hz
oil: CVTF
durability time: 100 hours
squeeze (center): 0.42 mm Abrasion to the extent that the surface became cloudy was evaluated as ○, abrasion with an uneven surface was evaluated as Δ, and mirror surface abrasion (P.L disappearance) was evaluated as x.

Pressure resistance: A micro sliding durability test was carried out under the following conditions on an oval ORY (inner diameter: 128.6×outer diameter: 135.8×thickness: 2.1 (mm) product shape), and the presence of damage on the seal side surface was visually determined.

temperature: 150° C.
pressure: 4.5 MPa
sliding distance: 0.5 mm
frequency: 40 Hz
oil: CVTF
number of times of durability: 10 million times
squeeze (Max): 0.60 mm No damage was evaluated as ◎, damage with a width of 10 mm or less in 5 or fewer places was evaluated as ○, damage of less than ⅓ of the entire circumference was evaluated as Δ, and damage of ⅔ or more of the entire circumference was evaluated as x.

Following table shows the results obtained.

TABLE

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| [Composition] | | | | | | | | |
| CF | 10 | 20 | 10 | 10 | 0 | 25 | 10 | 10 |
| CNT | 3 | 3 | 5 | 3 | 3 | 3 | 0 | 10 |
| PTFE | 10 | 10 | 10 | 0 | 10 | 10 | 10 | 10 |
| [Normal state physical properties] | | | | | | | | |
| Hs | 92 | 93 | 94 | 92 | 92 | 93 | 88 | 97 |
| Tb | 15.3 | 13.6 | 18.3 | 17.3 | 16 | 10.9 | 13 | 19 |
| Tb Evaluation | ○ | ○ | ◎ | ◎ | ○ | Δ | Δ | ◎ |
| Eb | 100 | 80 | 90 | 100 | 90 | 60 | 160 | 40 |
| Eb Evaluation | ○ | ○ | ○ | ○ | ○ | Δ | ◎ | X |
| [Results of evaluation] | | | | | | | | |
| Abrasion resistance | ○ | ○ | ○ | ○ | Δ | ○ | ○ | ○ |
| Pressure resistance | ○ | ○ | ◎ | ○ | ○ | ○ | X | ◎ |

Normal state physical properties: According to HS K6253 and K6251, hardness [Hs], rupture strength [Tb], and elongation at break [Eb] were measured. For the rupture strength (unit: MPa), 17.0 or more was evaluated as ◎, 13.5 to 16.9 was evaluated as ○, 10.0 to 13.4 was evaluated as Δ, and less than 10.0 was evaluated as x. For the elongation at break (unit: %), 130 or more was evaluated as ◎, 80 to 129 was evaluated as ○, 50 to 79 was evaluated as Δ, and less than 50 was evaluated as x.

The invention claimed is:

1. A transmission sealing member comprising a crosslinked fluororubber composition comprising 10 to 20 parts by weight of carbon fibers and 3 to 5 parts by weight of carbon nanotubes based on 100 parts by weight of fluororubber, wherein the fluororubber comprises at least one selected from the group consisting of vinylidene fluoride-hexafluoropropylene copolymer, vinylidene fluoride-tetrafluoroethylene-hexafluoropropylene terpolymer, and vinylidene fluoride-hexafluoropropylene-perfluo-roalkyl vinyl ether terpolymer, wherein the carbon fibers have an average fiber diameter of 5 to 20 μm, an average fiber length of 10 to 200 μm, and a Mohs hardness of 3 to 6.

2. The transmission sealing member according to claim 1, wherein the fluororubber composition further comprises 3 to 20 parts by weight of polytetrafluoroethylene.

3. The transmission seal member according to claim 1, wherein the transmission seal member is a continuously variable vehicle pulley seal member.

4. The transmission sealing member according to claim 1, wherein the carbon fibers have an average fiber diameter of 5 to 15 μm, an average fiber length of 20 to 100 μm, and a Mohs hardness of 4 to 6.

5. The transmission sealing member according to claim 1, wherein the carbon nanotubes have an average diameter of about 1 to 20 nm.

6. The transmission sealing member according to claim 5, wherein the carbon nanotubes have an average diameter of 5 to 15 nm, an average fiber length of 1-18 μm, and a BET specific surface area of 100-500 m²/g.

7. The transmission sealing member according to claim 6, wherein the carbon fibers have an average fiber diameter of 5 to 15 μm, an average fiber length of 20 to 100 μm, and a Mohs hardness of 4 to 6.

* * * * *